(12) United States Patent
Lee

(10) Patent No.: US 9,030,053 B2
(45) Date of Patent: May 12, 2015

(54) DEVICE FOR COLLECTING ENERGY WIRELESSLY

(76) Inventor: Choon Sae Lee, Dallas, TX (US)

( * ) Notice: Subject to any disclaimer, the term of this patent is extended or adjusted under 35 U.S.C. 154(b) by 593 days.

(21) Appl. No.: 13/476,850

(22) Filed: May 21, 2012

(65) Prior Publication Data

US 2012/0293020 A1    Nov. 22, 2012

Related U.S. Application Data

(60) Provisional application No. 61/487,762, filed on May 19, 2011, provisional application No. 61/559,160, filed on Nov. 14, 2011.

(51) Int. Cl.
*H01F 27/42* (2006.01)
*H02J 17/00* (2006.01)

(52) U.S. Cl.
CPC ...................................... *H02J 17/00* (2013.01)

(58) Field of Classification Search
USPC .......................................................... 307/104
See application file for complete search history.

(56) References Cited

U.S. PATENT DOCUMENTS

| | | | | |
|---|---|---|---|---|
| 3,671,822 | A | * | 6/1972 | Leno .............................. 361/288 |
| 3,760,243 | A | * | 9/1973 | Peroutky ....................... 200/600 |
| 3,826,979 | A | * | 7/1974 | Steinmann ..................... 361/178 |
| 6,289,237 | B1 | | 9/2001 | Mickle et al. |
| 6,615,074 | B2 | | 9/2003 | Mickle et al. |
| 6,856,291 | B2 | | 2/2005 | Mickle et al. |
| 7,027,311 | B2 | | 4/2006 | Vanderelli et al. |
| 7,057,514 | B2 | | 6/2006 | Mickle et al. |
| 7,084,605 | B2 | | 8/2006 | Mickle et al. |
| 7,373,133 | B2 | | 5/2008 | Mickle et al. |
| 7,383,064 | B2 | | 6/2008 | Mickle et al. |
| 7,403,803 | B2 | | 7/2008 | Mickle et al. |
| 7,440,780 | B2 | | 10/2008 | Mickle et al. |
| 7,567,824 | B2 | | 7/2009 | Mickle et al. |
| 7,639,994 | B2 | | 12/2009 | Greene et al. |
| 7,643,312 | B2 | | 1/2010 | Vanderelli et al. |

(Continued)

FOREIGN PATENT DOCUMENTS

WO        2011-062827 A2      5/2011

OTHER PUBLICATIONS

Kurs, Andre et al.; Wireless Power Transfer via Strongly Coupled Magnetic Resonances; Science, Jul. 6, 2007, pp. 83-86, vol. 317; (ISSN 0036-8075; online ISSN 1095-9203) AAAS; U.S.A.

*Primary Examiner* — Jared Fureman
*Assistant Examiner* — Duc M Pham
(74) *Attorney, Agent, or Firm* — Jack D. Stone, Jr.; Scheef & Stone, L.L.P.

(57) ABSTRACT

A device for collecting energy has first, second, and third capacitive plates, each spaced from, substantially parallel to, and electromagnetically coupled to each other. An inductor is coupled between two of the plates, and a load resistance is inductively coupled to the inductor for drawing energy from electromagnetic field excitation between the plates. In a further embodiment, the inductor includes a first inductor coupled in series with a second inductor, and the load resistance is inductively coupled to the second inductor for drawing energy from electromagnetic field excitation between the plates, and the device further includes a first capacitor coupled in parallel with and spaced apart from the first inductor, and a second capacitor coupled between the first and second capacitive plates. In a still further embodiment, energy is collected by a coaxial transmission feed line.

9 Claims, 2 Drawing Sheets

(56) References Cited

U.S. PATENT DOCUMENTS

| | | |
|---|---|---|
| 8,035,255 B2 | 10/2011 | Kurs et al. |
| 8,106,539 B2 | 1/2012 | Schatz et al. |
| 2007/0040680 A1* | 2/2007 | Chiu .......................... 340/572.1 |
| 2011/0241609 A1* | 10/2011 | Choi et al. ..................... 320/108 |
| 2011/0241612 A1* | 10/2011 | Ryu et al. ...................... 320/108 |
| 2012/0235636 A1* | 9/2012 | Partovi .......................... 320/108 |
| 2013/0335018 A1* | 12/2013 | Ichikawa ...................... 320/108 |

* cited by examiner

DEVICE FOR COLLECTING ENERGY WIRELESSLY

CROSS-REFERENCES TO RELATED APPLICATIONS

This application claims the benefit of U.S. Provisional Application No. 61/487,762 filed May 19, 2011, and U.S. Provisional Application No. 61/559,160 filed Nov. 14, 2011, both of which applications are hereby incorporated herein by reference, in their entirety.

TECHNICAL FIELD

The invention relates generally to energy collection and, more particularly, to a device for collecting electromagnetic energy wirelessly.

BACKGROUND

In many situations, it is necessary to constantly charge wireless devices, such as cellular phones or notebook computers, active RFID's, security devices in homes, wireless computer keyboards and mouses, and the like. Conventionally, this is accomplished primarily by use of wired chargers. However such practices are rather cumbersome and inconvenient; therefore, it is desirable to charge electronic devices wirelessly.

Wireless chargers are available, conventionally utilizing an inductive coupling scheme as depicted by FIG. 1, or alternatively, utilizing a capacitive coupling scheme as depicted in FIG. 2, discussed in further detail below. However, such schemes collect a relatively small amount of energy from its environment, unless there is a powerful field generator in close proximity.

Therefore, what is needed is an apparatus and method for collecting energy from the environment more efficiently than current methods allow for.

SUMMARY

The present invention, accordingly, provides a device for collecting energy, and includes first, second, and third capacitive plates, the first and second capacitive plates being spaced from, substantially parallel to, and electromagnetically coupled to each other, and the second and third capacitive plates being spaced from, substantially parallel to, and electromagnetically coupled to each other. An inductor is coupled between the second and third capacitive plates. A load resistance is inductively coupled to the inductor for drawing energy from electromagnetic field excitation between the three capacitive plates. The size and spacing of the capacitive plates, and the inductance are determined according to well-known formulas for facilitating resonance in the device at a pre-determined frequency.

In a further embodiment, the inductor comprises a first inductor coupled in series with a second inductor, and the load resistance is inductively coupled to the second inductor for drawing energy by inductive coupling. A capacitor is coupled in parallel with the first inductor.

In a still further embodiment, the inductor includes a first inductor coupled in series with a second inductor, and the load resistance is inductively coupled to the second inductor for drawing energy from electromagnetic field excitation by inductive coupling. A first capacitor is coupled in parallel with and spaced apart from the first inductor, and a second capacitor is coupled between the first and second capacitive plates.

The load resistance is one of a cell phone, a portable computer, a security sensor, a radio-frequency identification (RFID) tag, a cordless keyboard, a cordless mouse, and other wireless devices.

In an alternate embodiment of the invention, a device for collecting energy includes first and second capacitive plates spaced from, substantially parallel to, and electromagnetically coupled to each other. An inductor and a capacitor are coupled between the first capacitive plate and the second capacitive plate. A transmission line is coupled to the first capacitive plate and extends through a hole defined in the second capacitive plate for drawing energy from electromagnetic field excitation between the first capacitive plate and second capacitive plate.

In a further embodiment of the alternate embodiment, a third capacitive plate is spaced from, substantially parallel to, and electromagnetically coupled to the first capacitive plate, and a second capacitor is coupled between the first and third capacitive plates.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Further, as used herein, the term "substantially" is to be construed as a term of approximation. Terms such as "first", "second", and "third" may be used with different meanings in different portions of this application. References to inductors and transformers herein are preferably references to toroidal inductors and transformers, due to their compact form and small stray magnetic field. The term "resonance" preferably refers to the case when the operating frequency of the environmental electromagnetic energy to be collected is exactly the same as the resonant frequency of the device (e.g., the device 300, 400, 500, 600, 620 discussed below) and the resultant impedance is substantially only resistive. The term "near resonance" means that the operating frequency is not the same as the resonant frequency of the device, but is slightly off from the resonant frequency by a suitable amount to enhance the energy collection performance of the device. Depending on the operating frequency relative to the resonant frequency, the resultant impedance can be either more inductive or more capacitive. In the current application, the near resonance is preferably used to make the resultant impedance of a inductor and capacitor in parallel more inductive, resulting in an enhanced inductance, allowing for a smaller physical size of the device. "Externally supplied" or "external" capacitors more specifically means capacitors that are manufactured and commercially available externally, that is, not structurally built into the device as capacitive plates discussed below. External capacitors are preferably sufficiently small to physically fit between two plates, as discussed below, and preferably have substantial capacitances.

Figure 1:
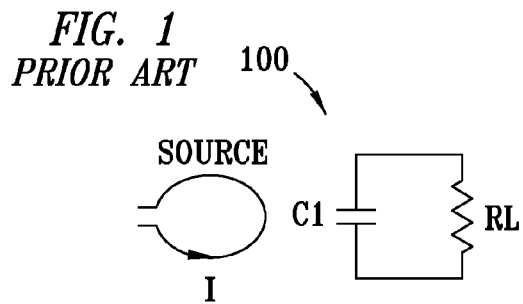
FIGS. 1 and 2 are schematic diagrams of prior art configurations for collecting energy wirelessly.
Figure 2:
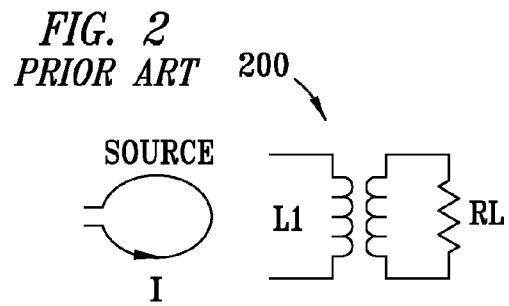

Referring to FIGS. 1 and 2 of the drawings, the reference numerals 100 and 200, respectively, generally designate energy collection devices embodying features of the prior art. The devices 100 and 200 include a source I of electromagnetic waves, commonly found in household appliances, such as light bulbs, electric appliances, electric motors, and the like, while alternating electric currents are flowing through them.

The energy collection device 100 includes a capacitor C1 coupled to a load resistance RL. The energy collection device 200 includes an inductor L1 coupled to the load resistance RL. The load resistance RL may be any wireless device, such as a cell phone, a laptop computer, cordless computer keyboard or mouse, an active RFID tag, home security sensors, other wireless device, or the like. A drawback with such conventional devices, such as devices 100 and 200, for collecting energy is that they have a relatively low field strength within the device, and they do not maximize the collected power from the energy stored in the device. As a result, only a very small amount of power is collected from the environment, unless there is a very powerful field generator in very close proximity.

Figure 3:
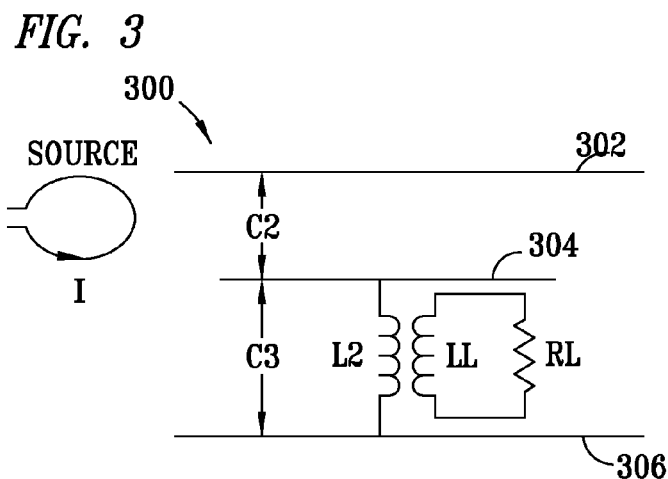
FIG. 3 is a schematic diagram exemplifying one embodiment for coupling capacitors with inductors for collecting energy wirelessly in accordance with principles of the present invention.

FIG. 3 depicts a device 300 for collecting energy, and includes a first substantially flat capacitive plate 302, a second substantially flat capacitive plate 304 substantially parallel to, spaced apart from, and electromagnetically coupled to the first plate 302, and a third substantially flat capacitive plate 306 substantially parallel to, spaced apart from, and electromagnetically coupled to the second plate 304. The first and third plates 302 and 306 are preferably about equivalent in size, and the second, or middle, plate 304 is preferably smaller than the first and third plates 302 and 306 by a few layer thicknesses; that is, if the distance between the plates 302 and 306 were designated by D, then the length and width of the plate 304 would preferably be about 1D to 2D less than the respective length and width of either of the plates 302 and 306. It can be appreciated that the first capacitive plate 302 and the second capacitive plate 304 constitute a first capacitor C2, and that the second capacitive plate 304 and the third capacitive plate 306 constitute a second capacitor C3. The space between the plates 302, 304, and 306 may comprise air or a conventional dielectric or even electrical components, such as a circuit board or the like. An inductor L2 is coupled between the second capacitive plate 304 and the third capacitive plate 306. The load resistance RL is inductively coupled to the inductor L2 through a transformer load coil LL. The size and spacing of the capacitive plates 302, 304, and 306, and the inductance of L2 as well as the load transformer coil LL are determined according to well-known formulas for facilitating resonance in the device 300 at a predetermined frequency, such as, by way of example but not limitation, 60 Hz.

In operation, the device 300 is positioned proximate to (e.g., within five meters of) the source of electromagnetic energy transmitted at the resonant frequency for which the device 300 is designed. An electromagnetic field is then excited between the first capacitive plate 302 and the second capacitive plate 304, and between the second capacitive plate 304 and the third capacitive plate 306. Energy generated from the excited electromagnetic field is then drawn through a transformer coil LL by inductive coupling and collected for the load resistance RL.

It may be appreciated that the capacitance of the two plates 302 and 304 and the inductor L2 form a resonant circuit in series approximately at a frequency of $1/[2\pi(L2'C2)^{1/2}]$ at which higher fields are induced in C2 and C3. Here L2' is the effective inductance between plates 304 and 306 that is approximately that of inductor L2 and capacitor C3 in parallel. The induced energy at L2 is collected by LL by inductive coupling and the collected energy is transferred to the load resistance RL.

Figure 4:
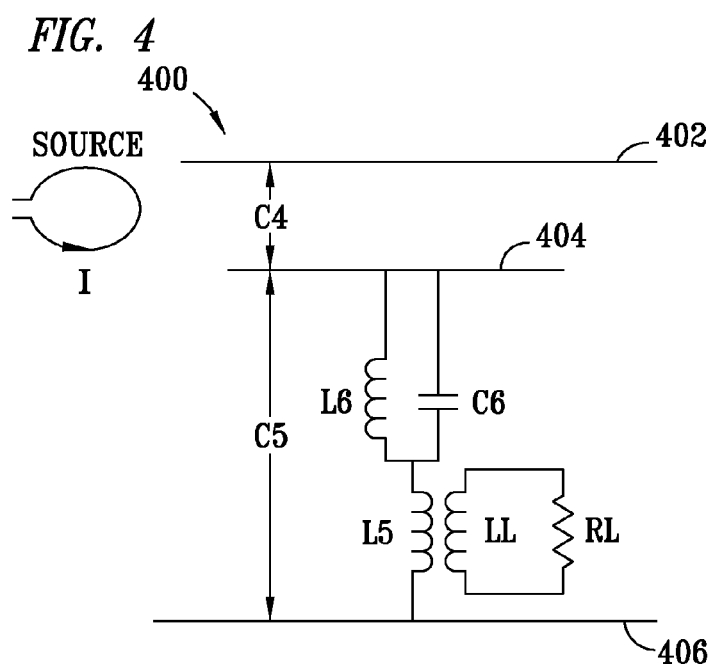
FIG. 4 is a schematic diagram exemplifying an alternative embodiment of the invention, wherein a capacitor is coupled in parallel with an inductor to reduce the inductance required, in accordance with principles of the present invention.

FIG. 4 depicts a device 400 for collecting energy, and includes a first substantially flat capacitive plate 402, a second substantially flat capacitive plate 404 substantially parallel to, spaced apart from, and electromagnetically coupled to the first plate 402, and a third substantially flat capacitive plate 406 substantially parallel to, spaced apart from, and electromagnetically coupled to the second plate 404, similarly as with the plates 302, 304, and 306 of the device 300 discussed above with respect to FIG. 3. The first and third plates 402 and 406 are preferably about equivalent in size, and the second, or middle, plate 404 is preferably smaller than the first and third plates 402 and 406 by a few layer thicknesses; that is, if the distance between the plates 402 and 406 were designated by D, then the length and width of the plate 404 would preferably be about 1D to 2D less than the respective length and width of either of the plates 402 and 406. It can be appreciated that the first capacitive plate 402 and the second capacitive plate 404 constitute a first capacitor C4, and that the second capacitive plate 404 and the third capacitive plate 406 constitute a second capacitor C5. The space between the plates 402, 404, and 406 may comprise air or a conventional dielectric or even electrical components, such as a circuit board or the like. Two inductors L5 and L6 are coupled in series between the second and third plates 404 and 406. A capacitor C6 is coupled in parallel with the inductor L6, and the load resistance RL is inductively coupled to the inductor L5 through a load coil LL. The size and spacing of the capacitive plates 402, 404, and 406, the capacitance of the capacitor C6, and the inductances of L5 and L6 as well as the load transformer coil LL are determined according to well-known formulas for facilitating resonance in the device 400 at a predetermined frequency, such as, by way of example but not limitation, 60 Hz.

In operation, the device 400 is positioned proximate to (e.g., within five meters of) the source of electromagnetic energy transmitted at the resonant frequency for which the device 400 is designed. An electromagnetic field is then excited between the first capacitive plate 402 and the second capacitive plate 404, and between the second capacitive plate 404 and the third capacitive plate 406. Energy generated from the excited electromagnetic field is then drawn through a transformer coil LL by inductive coupling and collected for the load resistance RL.

By the use of the device depicted in FIG. 4, inductance L6 and capacitance C6 are chosen such that the equivalent impedance of the circuit of L6 and C6 in parallel is slightly off from the resonance to make the circuit highly inductive, resulting in an inductance that is much larger than that of the inductor L6 alone. Thus, by using the device 400, a smaller inductance is required to form a resonance in the device. As a consequence, the parallel-coupled inductor L6 and capacitor C6 is equivalent to an inductor of much larger inductance, so that the inductor L6 required for resonance may be smaller than the inductance L2 in the device 300.

It may be appreciated that the embodiment of FIG. 4 is an improvement over the embodiment of FIG. 3. C2 has a small capacitance, typically less than 1 nF, and so L2 has to be large to form a resonance at low frequencies. In order to reduce the size of the inductor L2, the inductor L2 is split between two inductor components L6 and L5. An externally supplied capacitor C6 is coupled in parallel to the inductor L6. The capacitance of C6 is chosen such that the resultant circuit of a capacitor and an inductor in parallel is at near resonance and highly inductive. As a result, the equivalent inductance of the resultant circuit is much larger than that of L6, giving a magnified inductance, resulting in a much smaller inductor required for resonance of the device. The transformer to collect energy by inductive coupling is substantially the same as that in the device 300 described above with respect to FIG. 3.

Figure 5:
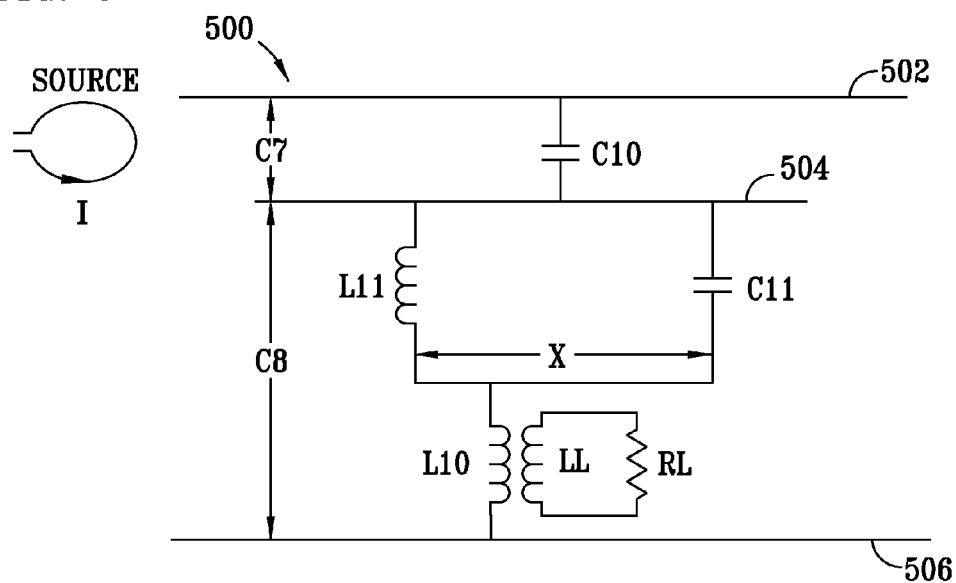
FIG. 5 is a schematic diagram exemplifying an alternative embodiment to that depicted by FIG. 4, wherein the capacitor and inductor are spaced apart to optimize performance at low frequencies, while further reducing the inductance required.

FIG. 5 depicts a device 500 for collecting energy, and includes a first substantially flat capacitive plate 502, a second substantially flat capacitive plate 504 substantially parallel to, spaced apart from, and electromagnetically coupled to the first plate 502, and a third substantially flat capacitive plate 506 substantially parallel to, spaced apart from, and electromagnetically coupled to the second plate 504, similarly as with the plates 302, 304, and 306 of the device 300 discussed above with respect to FIG. 3. The first and third plates 502 and 506 are preferably about equivalent in size, and the second, or middle, plate 504 is preferably smaller than the first and third plates 502 and 506 by a few layer thicknesses; that is, if the distance between the plates 502 and 506 were designated by D, then the length and width of the plate 504 would preferably be about 1D to 2D less than the respective length and width of either of the plates 502 and 506. It can be appreciated that the first capacitive plate 502 and the second capacitive plate 504 constitute a first capacitor C7, and that the second capacitive plate 504 and the third capacitive plate 506 constitute a second capacitor C8. The space between the plates 502, 504, and 506 may comprise air or a conventional dielectric or even electrical components, such as a circuit board or the like. Two inductors L10 and L11 are coupled in series between the second and third plates 504 and 506. A capacitor C11 is coupled in parallel with the inductor L11, and is preferably spaced apart from the inductor L11 by a space X, which is preferably as much space as is physically possible, which, by way of example but not limitation, in a cell phone may be about ten centimeters. A further capacitor C10 is preferably coupled between the first plate 502 and the second plate 504. The load resistance RL is inductively coupled to the inductor L10 through a load coil LL. The size and spacing of the capacitive plates 502, 504, and 506, the capacitance of the capacitors C10 and C11, and the inductances of L10 and L11 as well as the load transformer coil LL are determined according to well-known formulas for facilitating resonance in the device 500 at a predetermined frequency, such as, by way of example but not limitation, 60 Hz.

In operation, the device 500 is positioned proximate to (e.g., within five meters of) the source of electromagnetic energy transmitted at the resonant frequency for which the device 500 is designed. An electromagnetic field is then excited between the first capacitive plate 502 and the second capacitive plate 504, and between the second capacitive plate 504 and the third capacitive plate 506. Energy generated from the excited electromagnetic field is then drawn through a transformer coil LL by inductive coupling and collected for the load resistance RL.

By coupling the capacitor C10 between the first and second plates 502 and 504, the size of the inductor L11 may be reduced. A capacitor of two parallel plates is relatively small and a large inductor may be required to form a resonance at low frequencies. By use of an externally supplied capacitor C10, that tends to be large, the size of the inductor L11 may be substantially reduced, making it feasible to use the device 500 in cell phones in an environment with 60 Hz electromagnetic fields. However, the addition of C10 may reduce the receptive power. In order to increase the power levels, L11 and C11 are separated to form a loop. The larger the loop, the more energy that is collected.

It may be appreciated that the embodiment of FIG. 5 allows the inductor of FIG. 4 to be further decreased in size. This is achieved by coupling an externally supplied capacitor C10 between the first and second plates 502 and 504. The capacitance of the capacitor C10 can be much larger than the capacitance of C4 of FIG. 4. Thus, the inductance of L11 that is required for resonance is much smaller than that of L6 across the capacitor C5 of FIG. 4. As C10 is connected, the induced power is significantly reduced. In order to compensate for such loss, inductor L11 and capacitor C11 are widely separated to form a loop. The larger the loop is, the greater is the energy that will be collected.

Figure 6A:
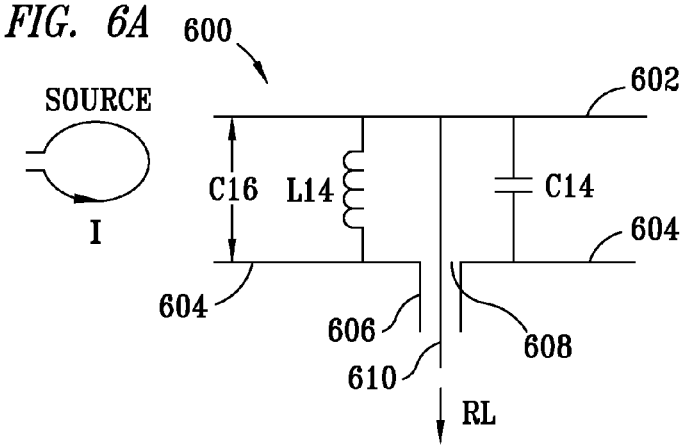
FIGS. 6A and 6B are schematic diagrams exemplifying an alternative embodiment of the invention utilizing a transmission line.

FIG. 6A depicts a device 600 for collecting energy, and includes a first substantially flat capacitive plate 602 and a second substantially flat capacitive plate 604 substantially parallel to, spaced apart from, and electromagnetically coupled to the first plate 602. It can be appreciated that the first capacitive plate 602 and the second capacitive plate 604 constitute a capacitor C16. The space between the plates 604 and 606 may comprise air or a conventional dielectric or even electrical components, such as a circuit board or the like. An inductor L14 is coupled between the first and second plates 604 and 606. An externally supplied capacitor C14 is coupled in parallel with the inductor L14. The inductor L14 and the capacitor C14 are preferably physically separated as much as possible to enhance device performance in the collection of energy. A transmission line 610 is connected to the first plate 602 and extends through an opening 608 in the second plate 604 via a coaxial transmission line 606 to the load resistance RL. The size and spacing of the capacitive plates 602 and 604, the capacitance of the capacitor C14, and the inductances of the inductor L14 are determined according to well-known formulas for facilitating resonance in the device 600 at a predetermined frequency, such as, by way of example but not limitation, 60 Hz.

In operation, the device 600 is positioned proximate to (e.g., within five meters of) the source of electromagnetic energy transmitted at the resonant frequency for which the device 600 is designed. An electromagnetic field is then excited between the first capacitive plate 602 and the second capacitive plate 604. Energy generated from the excited electromagnetic field is then collected through the transmission line 610 for the load resistance RL.

Figure 6B:
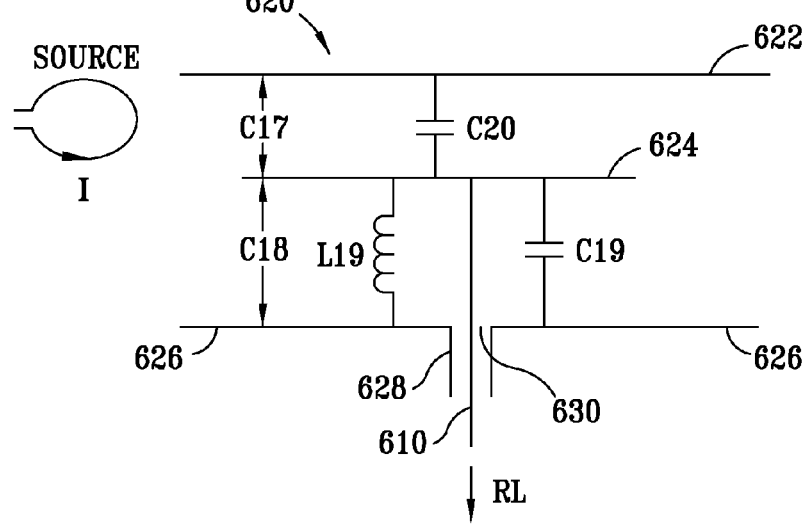

FIG. 6B depicts a device 620 for collecting energy, and includes a first substantially flat capacitive plate 622, a second substantially flat capacitive plate 624 substantially parallel to, spaced apart from, and electromagnetically coupled to the first plate 622, and a third substantially flat capacitive plate 626 substantially parallel to, spaced apart from, and electromagnetically coupled to the second plate 624, similarly as with the plates 302, 304, and 306 of the device 300 discussed above with respect to FIG. 3. The first and third plates 622 and 626 are preferably about equivalent in size, and the second, or middle, plate 624 is preferably smaller than the first and third plates 622 and 626 by a few layer thicknesses; that is, if the distance between the plates 622 and 626 were designated by D, then the length and width of the plate 624 would preferably be about 1D to 2D less than the respective length and width of either of the plates 622 and 626. It can be appreciated that the first capacitive plate 622 and the second capacitive plate 624 constitute a first capacitor C17, and that the second capacitive plate 624 and the third capacitive plate 626 constitute a second capacitor C18. The space between the plates 622, 624, and 626 may comprise air or a conventional dielectric or even electrical components, such as a circuit board or the like. An inductor L19 is coupled between the second and third plates 624 and 626. A capacitor C19 is coupled in parallel with the inductor L19. The capacitor C19 and the inductor L19 are preferably physically separated as much as practically possible to enhance device performances in the collection of energy. A further externally supplied capacitor C20 is preferably coupled between the first plate 622 and the second plate 624. The transmission line 610 is connected to the second plate 624 and extends through an opening 630 in the third plate 626 via a coaxial transmission line 628 to the load resistance RL. The size and spacing of the capacitive plates 622, 624, and 626, the capacitances of the capacitors C19 and C20, and the inductance of the inductor L19 are determined according to well-known formulas for facilitating resonance in the device 620 at a predetermined frequency, such as, by way of example but not limitation, 60 Hz. More specifically, the inductor L19 and the capacitor C19 are properly selected such that the resultant impedance of those components in parallel is slightly off the resonance to give a large inductance of the circuit resulting in a magnified inductance of L19. The resultant circuit is the capacitor C20 and the equivalent inductor of magnified inductance of the inductor L19 in series with the capacitor C20, giving a smaller inductor L19 required for resonance in the device 620.

In operation, the device 620 is positioned proximate to (e.g., within five meters of) the source of electromagnetic energy transmitted at the resonant frequency for which the device 620 is designed. An electromagnetic field is then excited between the first capacitive plate 622 and the second capacitive plate 624, and between the second capacitive plate 624 and the third capacitive plate 626. Energy generated from the excited electromagnetic field is then collected through the transmission line 610 for the load resistance RL.

It may be appreciated that, by collecting energy via a coaxial transmission line, the collection device by inductive coupling (i.e., LL and RL of FIGS. 3-5) may be eliminated. FIG. 6A is a simple scheme for such application. FIG. 6B is an improvement of FIG. 6A to improve the energy collection performance by introducing the externally supplied capacitor C20 between the first and second plates 622 and 624.

It is understood that the present invention may take many forms and embodiments. Accordingly, several variations may be made in the foregoing without departing from the spirit or the scope of the invention. For example, the middle capacitive plate discussed above (e.g., plates 304, 404, 504, 624) may comprise electrical components, such as a circuit board of a cell phone, or the like.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A device for collecting energy, the device comprising:
   a first capacitive plate;
   a second capacitive plate spaced from, substantially parallel to, and electromagnetically coupled to the first capacitive plate;
   a third capacitive plate spaced from, substantially parallel to, and electromagnetically coupled to the second capacitive plate;
   an inductor coupled between the second capacitive plate and the third capacitive plate; and
   a load resistance inductively coupled to the inductor for drawing energy from electromagnetic field excitation between the first capacitive plate, second capacitive plate, and third capacitive plate.

2. The device of claim 1 further wherein the inductor comprises a first inductor coupled in series with a second inductor, the load resistance is inductively coupled to the second inductor for drawing energy from electromagnetic field excitation between the first capacitive plate, second capacitive plate, and third capacitive plate, and the device further comprises a capacitor coupled in parallel with the first inductor.

3. The device of claim 1 further wherein the inductor comprises a first inductor coupled in series with a second inductor, the load resistance is inductively coupled to the second inductor for drawing energy from electromagnetic field excitation between the first capacitive plate, second capacitive plate, and third capacitive plate, and the device further comprises a first capacitor coupled in parallel with and spaced apart from the first inductor, and a second capacitor coupled between the first capacitive plate and second capacitive plate.

4. The device of claim 1, wherein the first capacitive plate, second capacitive plate, and third capacitive plate are sized and spaced, and the inductor is sized for facilitating resonance at a first frequency for facilitating energy collection at a second frequency.

5. The device of claim 1, wherein the load resistance is at least one of a cell phone, a portable computer, a security sensor, a radio-frequency identification (RFID) tag, a cordless keyboard, and a cordless mouse.

6. A device for collecting energy, the device comprising:
  a first capacitive plate;
  a second capacitive plate spaced from, substantially parallel to, and electromagnetically coupled to the first capacitive plate;
  an inductor coupled between the first capacitive plate and the second capacitive plate;
  a capacitor coupled between the first capacitive plate and the second capacitive plate; and
  a transmission line coupled to the first capacitive plate and extending through a hole defined in the second capacitive plate for drawing energy from electromagnetic field excitation between the first capacitive plate and second capacitive plate.

7. The device of claim 6 wherein the capacitor is a first capacitor, and the device further comprises:
  a third capacitive plate spaced from, substantially parallel to, and electromagnetically coupled to the first capacitive plate; and
  a second capacitor coupled between the first capacitive plate and the second capacitive plate.

8. The device of claim 6, wherein the first capacitive plate and second capacitive plate are sized and spaced, and the capacitor and inductor are sized for facilitating resonance at a first frequency for facilitating energy collection at a second frequency.

9. The device of claim 6, wherein the load resistance is at least one of a cell phone, a portable computer, a security sensor, a radio-frequency identification (RFID) tag, a cordless keyboard, and a cordless mouse.

* * * * *